United States Patent
Seol

(10) Patent No.: US 11,552,336 B2
(45) Date of Patent: Jan. 10, 2023

(54) BATTERY PACK

(71) Applicant: SAMSUNG SDI CO., LTD., Yongin-si (KR)

(72) Inventor: Jihwan Seol, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 36 days.

(21) Appl. No.: 16/911,514

(22) Filed: Jun. 25, 2020

(65) Prior Publication Data
US 2021/0028502 A1  Jan. 28, 2021

(30) Foreign Application Priority Data

Jul. 25, 2019 (KR) .......................... 10-2019-0090496

(51) Int. Cl.
| | |
|---|---|
| *H01M 10/42* | (2006.01) |
| *H01M 50/502* | (2021.01) |
| *H01M 10/48* | (2006.01) |
| *H01M 10/6555* | (2014.01) |

(52) U.S. Cl.
CPC ....... *H01M 10/425* (2013.01); *H01M 10/482* (2013.01); *H01M 10/486* (2013.01); *H01M 10/6555* (2015.04); *H01M 50/502* (2021.01)

(58) Field of Classification Search
CPC ............. H01M 10/425; H01M 10/482; H01M 10/613; H01M 10/486; H01M 10/625; H01M 10/6554; H01M 10/6555; H01M 2200/105; H01M 2200/106; H01M 2200/20; H01M 50/20; H01M 50/502; Y02E 60/10

See application file for complete search history.

(56) References Cited

U.S. PATENT DOCUMENTS

| | | | |
|---|---|---|---|
| 5,245,269 | A  | 9/1993  | Tooley et al. |
| 8,373,535 | B2 | 2/2013  | Lavenuta |
| 8,822,051 | B2 | 9/2014  | Yoo |
| 9,159,968 | B2 | 10/2015 | Park et al. |
| 9,444,086 | B2 | 9/2016  | Shimizu et al. |

(Continued)

FOREIGN PATENT DOCUMENTS

| | | |
|---|---|---|
| CN | 101523635 A | 9/2009 |
| CN | 102246330 A | 11/2011 |

(Continued)

OTHER PUBLICATIONS

Extended European Search Report dated Nov. 17, 2020 by the European Patent Office for corresponding European Patent Application No. 20183140.1.

(Continued)

*Primary Examiner* — Stewart A Fraser
*Assistant Examiner* — Lilia Nedialkova
(74) *Attorney, Agent, or Firm* — Lee IP Law, P.C.

(57) ABSTRACT

A battery pack includes a cell block including battery cells electrically connected to each other, the cell block having a pair of long sides and a pair of short sides which surround lateral surfaces of the battery cells and are tangent to the lateral surfaces of the battery cells, and a flexible wiring surrounding the cell block in a direction parallel to the pair of long sides of the cell block, the flexible wiring including sensors to detect state information from the battery cells.

18 Claims, 8 Drawing Sheets

(56) References Cited

U.S. PATENT DOCUMENTS

| | | | |
|---|---|---|---|
| 9,466,863 B2 | 10/2016 | Hong et al. | |
| 9,515,356 B2 | 12/2016 | Zeng et al. | |
| 9,917,336 B2 | 3/2018 | Nakano et al. | |
| 10,205,331 B2 | 2/2019 | Jung | |
| 2002/0102457 A1* | 8/2002 | Oogami | H01M 50/502 |
| | | | 429/159 |
| 2002/0182480 A1 | 12/2002 | Hanauer et al. | |
| 2011/0195284 A1 | 8/2011 | Yasui et al. | |
| 2012/0169289 A1 | 7/2012 | Kim et al. | |
| 2013/0193977 A1 | 8/2013 | Houchin-Miller | |
| 2015/0118530 A1 | 4/2015 | Lee | |
| 2015/0287964 A1* | 10/2015 | Park | H01M 10/48 |
| | | | 429/87 |
| 2015/0372354 A1* | 12/2015 | Nakano | H01M 10/482 |
| | | | 429/90 |
| 2016/0322838 A1* | 11/2016 | Jung | H01M 10/4257 |

FOREIGN PATENT DOCUMENTS

| | | |
|---|---|---|
| CN | 108511844 A | 9/2018 |
| EP | 2 357 688 A1 | 8/2011 |
| JP | 2002-25633 A | 1/2002 |
| JP | 2003-178732 A | 6/2003 |
| JP | 2012-038468 A | 2/2012 |
| JP | 2013-098031 A | 5/2013 |
| JP | 2014-132585 A | 7/2014 |
| JP | 5593591 B2 | 8/2014 |
| JP | 2017-096687 A | 6/2017 |
| JP | 6227569 B2 | 10/2017 |
| KR | 10-0854413 B1 | 8/2008 |
| KR | 10-2012-0053458 A | 5/2012 |
| KR | 10-2012-0078373 A | 7/2012 |
| KR | 10-2015-0048501 A | 5/2015 |
| KR | 10-1537457 B1 | 7/2015 |
| KR | 10-1642341 B1 | 7/2016 |
| KR | 10-2016-0128792 A | 11/2016 |
| KR | 10-2016-0149576 A | 12/2016 |
| KR | 10-1836408 B1 | 3/2018 |
| KR | 10-2018-0088197 A | 8/2018 |

OTHER PUBLICATIONS

Chinese Office action dated Jul. 4, 2022 for corresponding CN Patent Application No. 202010721156.4.

* cited by examiner

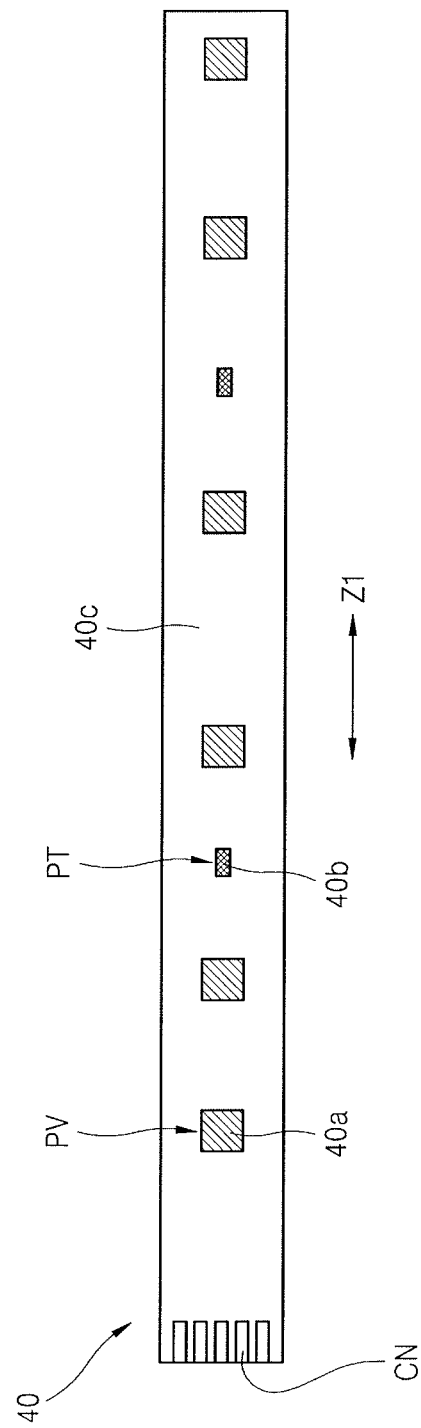

BATTERY PACK

CROSS-REFERENCE TO RELATED APPLICATION

Korean Patent Application No. 10-2019-0090496, filed on Jul. 25, 2019, in the Korean Intellectual Property Office, and entitled: "Battery Pack," is incorporated by reference herein in its entirety.

BACKGROUND

1. Field

One or more embodiments relate to a battery pack.

2. Description of Related Art

In general, secondary batteries refer to batteries that can be charged and recharged unlike non-rechargeable primary batteries. Secondary batteries are used as energy sources of devices, e.g., mobile devices, electric vehicles, hybrid vehicles, electric bicycles, or uninterruptible power supplies. Secondary batteries may be used individually or in modules (packs), e.g., each module may include a plurality of secondary batteries connected as one unit, according to the types of external devices using the secondary batteries.

Unlike small mobile devices, e.g., cellular phones, that are operable for a certain period of time using a single battery, large devices, e.g., electric vehicles or hybrid vehicles, have long operation times and consume large amounts of electricity, and therefore, implement battery modules (packs) including a plurality of batteries (battery cells) to address larger power and capacity requirements. The output voltages or currents of battery modules may be increased by adjusting the number of batteries included in each battery module.

SUMMARY

According to one or more embodiments, a battery pack may include a cell block with battery cells electrically connected to each other, the cell block having a pair of long sides and a pair of short sides which surround lateral surfaces of the battery cells and are tangent to the lateral surfaces of the battery cells, and a flexible wiring surrounding the cell block in a direction parallel to the pair of long sides of the cell block, the flexible wiring including sensors to detect state information from the battery cells.

For example, the flexible wiring may surround opposite upper and lower surfaces and opposite first and second lateral surfaces of the cell block and may be configured to collect state information from the group of battery cells.

For example, the flexible wiring may surround the opposite upper and lower surfaces and the opposite first and second lateral surfaces of the cell block in opposite directions parallel to the pair of long sides of the cell block.

For example, the flexible wiring may form voltage detection positions on the upper and lower surfaces of the cell block, and temperature detection positions on the first and second lateral surfaces of the cell block.

For example, the flexible wiring may include an end extension portion extending along the lower surface of the cell block and into the cell block, and the end extension portion may form a temperature detection position inside the cell block.

For example, the battery pack may further include a holder into which the group of battery cells are inserted, the holder including a first holder and a second holder which are separate from each other in the direction parallel to the pair of long sides of the cell block, wherein the end extension portion may extend into the cell block through a gap between the first and second holders.

For example, the flexible wiring may make, at voltage detection positions, conductive contact with a tab plate which electrically connects the group of battery cells to each other, and the flexible wiring may make, at temperature detection positions, thermal contact with the lateral surfaces of the group of battery cells.

For example, the battery pack may further include a plurality of tab plates electrically connecting the group of battery cells to each other and arranged in the direction parallel to the pair of long sides of the cell block, wherein the flexible wiring may extend across the plurality of tab plates and forms voltage detection positions while making conductive contact with the plurality of tab plates.

For example, the flexible wiring may include bent portions which are formed in front of and behind a temperature detection position in a length direction of the flexible wiring.

For example, the battery pack may further include a circuit board connected to the flexible wiring, and a cooling plate between the circuit board and the cell block, wherein the flexible wiring may extend from a connection position with the circuit board along the cooling plate to bypass the cooling plate, and may extend between the cooling plate and the cell block to form voltage detection positions.

For example, the flexible wiring may include a first flexible wire extending along the cell block in a forward direction parallel to the pair of long sides of the cell block, and a second flexible wire extending along the cell block in a reverse direction parallel to the pair of long sides of the cell block.

For example, the first flexible wire may extend along the cell block in a clockwise direction parallel to the pair of long sides of the cell block, and the second flexible wire may extend along the cell block in a counterclockwise direction parallel to the pair of long sides of the cell block.

For example, the first flexible wire may extend along an upper surface and a first lateral surface of the cell block to a side of a lower surface of the cell block, and the second flexible wire may extend along a second lateral surface of the cell block to the other side of the lower surface of the cell block.

For example, the battery pack may further include a cooling plate on the cell block, wherein the first flexible wire may extend between the cooling plate and the upper surface of the cell block.

For example, the battery pack may further include a holder into which the group of battery cells are inserted, the holder including a first holder and a second holder which are separate from each other in the direction parallel to the pair of long sides of the cell block, and the side and the other side of the lower surface of the cell block may respectively correspond to lower surfaces of the second and first holders.

For example, the second flexible wire may extend along the other side of the lower surface of the cell block into the cell block.

For example, the flexible wiring may form voltage detection positions together with a plurality of tab plates arranged in a length direction of the flexible wiring.

For example, the flexible wiring may form voltage detection positions and temperature detection positions that are spaced apart from each other in a length direction of the flexible wiring.

For example, wherein the flexible wiring may include thermistors mounted on the flexible wiring at temperature detection positions.

BRIEF DESCRIPTION OF THE DRAWINGS

Features will become apparent to those of skill in the art by describing in detail exemplary embodiments with reference to the attached drawings, in which:

FIG. 8 is a view illustrating a structure of the flexible wiring.

DETAILED DESCRIPTION

Figure 1:
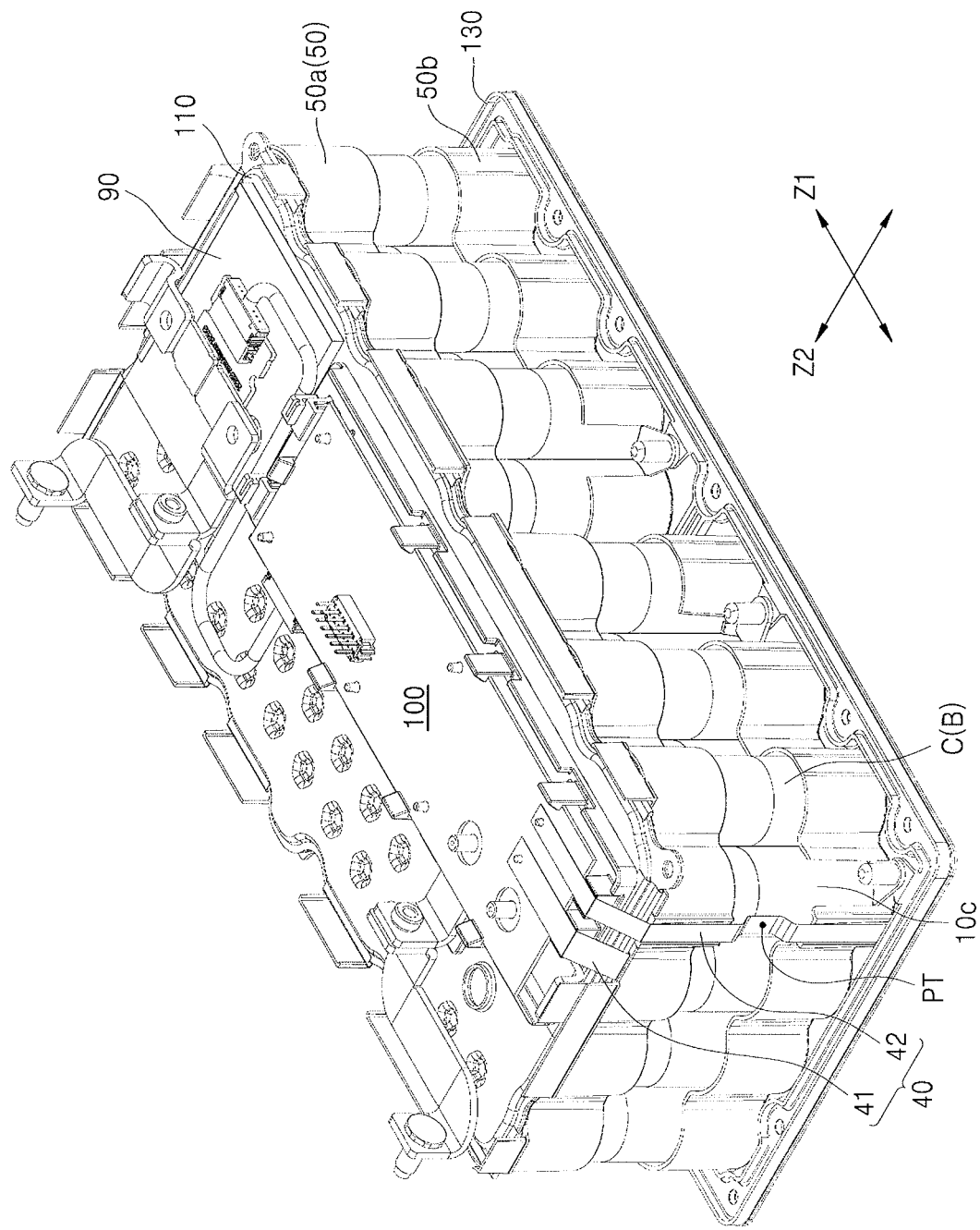
FIG. 1 is a perspective view illustrating a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

As used herein, the term "and/or" includes any and all combinations of one or more of the associated listed items. Throughout the disclosure, the expression "at least one of a, b or c" indicates only a, only b, only c, both a and b, both a and c, both b and c, all of a, b, and c, or variations thereof.

A battery pack will now be described according to embodiments with reference to the accompanying drawings.

Figure 2:
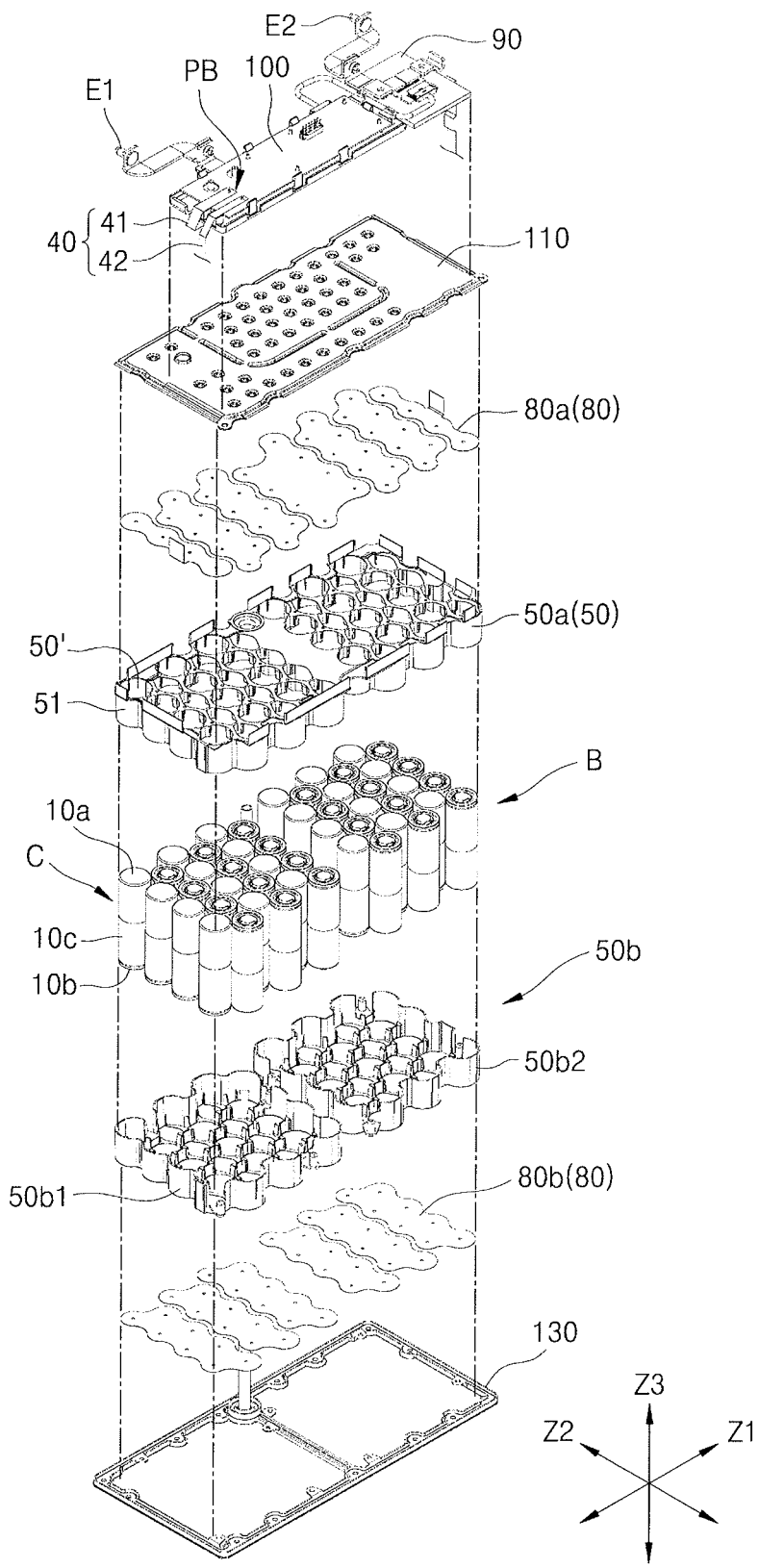
FIG. 2 is an exploded perspective view illustrating the battery pack in FIG. 1.

FIG. 1 is a perspective view illustrating a battery pack according to an embodiment. FIG. 2 is an exploded perspective view illustrating the battery pack in FIG. L FIG. 3 is a perspective view illustrating a cell block in FIG. 2.

Referring to FIGS. 1-2, according to an embodiment, a battery pack may include a plurality of battery cells C, a holder 50 structurally binding the battery cells C together, and tab plates 80 electrically connecting the battery cells C to each other. A cooling plate 110 and a circuit board 100 may be sequentially arranged above the tab plates 80.

In detail, the battery cells C may be, e.g., cylindrical battery cells. Each battery cell C may include an upper end portion 10a and a lower end portion 10b which form both ends of the battery cell C in the length direction of the battery cell C (e.g., along direction Z3), and a cylindrical lateral surface 10c formed between the upper end portion 10a and the lower end portion 10b. The upper end portion 10a and the lower end portion 10b of each battery cell C may form electrodes having different polarities. Throughout the present specification, the upper end portion 10a and the lower end portion 10b of each battery cell C may respectively refer to an end portion at an upper position and an end portion at a lower position in a vertical direction (e.g., direction Z3) parallel to the length direction of the battery cell C, and may not be distinguished from each other according to the polarities thereof such as a positive polarity and a negative polarity. That is, the upper end portions 10a of battery cells C adjacent to each other may have the same polarity or different polarities according to the vertical orientations of the battery cells C. Similarly, the lower end portions 10b of battery cells C adjacent to each other may have the same polarity or different polarities according to the vertical orientations of the battery cells C.

Figure 3:
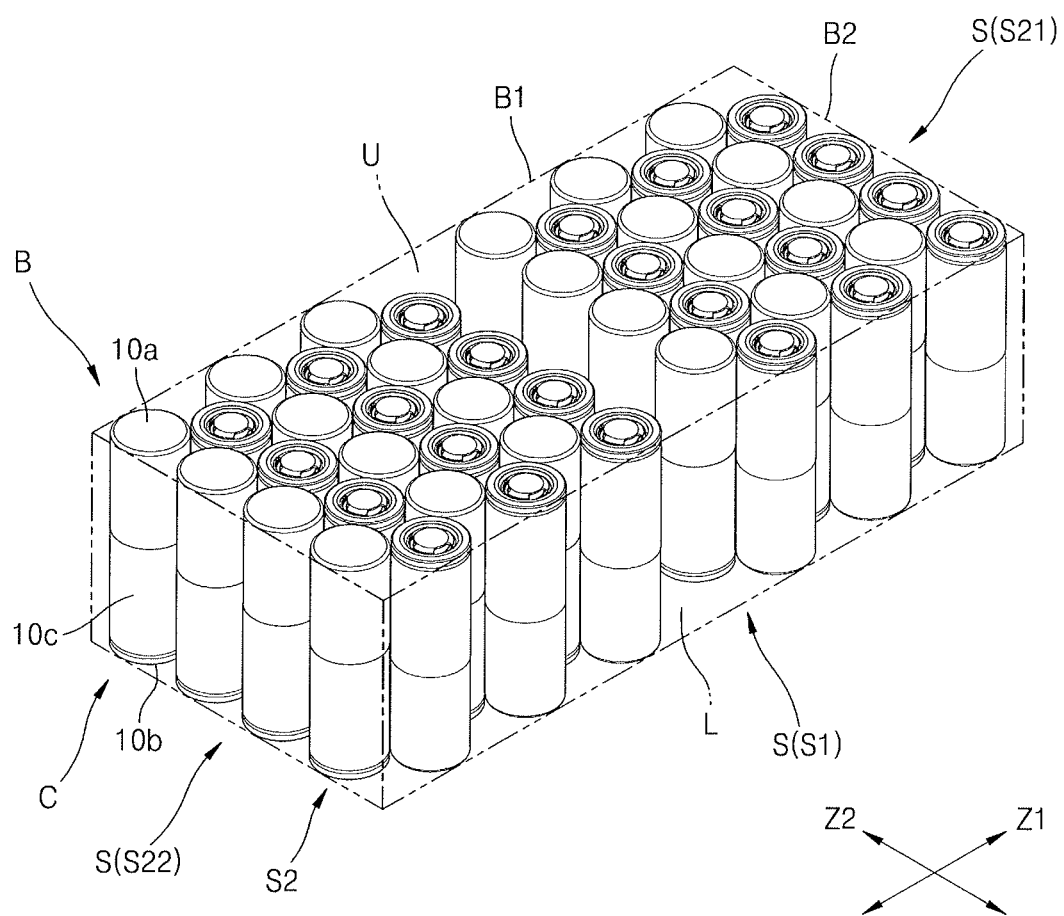
FIG. 3 is a perspective view illustrating a cell block in FIG. 2.

Referring to FIG. 3, the battery cells C may be electrically connected to each other and may form a cell block B. The cell block B may be a polygonal region that includes a group of battery cells C electrically connected to each other, surrounds the outside of the group of battery cells C, and makes contact with the group of battery cells C. For example, the cell block B may be defined as a polyhedral region including an upper surface U facing the upper end portions 10a of the group of battery cells C, a lower surface L facing the lower end portions 10b of the group of battery cells C, and lateral surfaces S facing the lateral surfaces 10c of the group of battery cells C. In this case, the upper surface U, the lower surface L, and the lateral surfaces S of the cell block B may be defined as surfaces that surround the outside of the group of battery cells C and make contact with the group of battery cells C. The cell block B may be a virtual, e.g., imaginary, block with specific defined virtual surfaces that facilitate explanation and definition of elements relative to the group of cells C.

For example, the cell block B may be defined as a polyhedral region that includes a flat surface making contact with the upper end portions 10a of the group of battery cells C as the upper surface U, a flat surface making contact with the lower end portions 10b of the group of battery cells C as the lower surface L, and flat surfaces making contact with the lateral surfaces 10c of the group of battery cells C as the lateral surfaces S. For example, even though the lateral surfaces 10c of the battery cells C may be formed in a cylindrical shape, e.g., to have curved or wavy surfaces, the lateral surfaces S of the cell block B may be flat surfaces surrounding and being tangent to the lateral surfaces 10c of the battery cells C (e.g., rather than being wavy surfaces connecting and tracing the lateral surfaces 10c of the battery cells C adjacent to each other). In an embodiment, the cell block B may be formed in a hexahedral shape, and the lateral surfaces S of the cell block B may include a pair of long lateral surfaces S1 and a pair of short lateral surfaces S2 that surround and are tangent to the lateral surfaces 10c of the group of battery cells C.

Each of the upper surface U and the lower surface L of the cell block B may be a quadrangular surface that has a pair of long sides B1 and a pair of short sides B2 as neighboring sides. For example, the long sides B1 of the cell block B may be relatively long sides along which the upper surface U (or the lower surface L) and the long lateral surfaces S1 of the cell block B having a hexahedral shape are in contact with each other. In addition, the short sides B2 of the cell block B may be relatively short sides along which the upper surface U (or the lower surface L) and the short lateral surfaces S2 of the cell block B having a hexahedral shape are in contact with each other. As described above, the lateral surfaces S of the cell block B are not waved surfaces connecting the lateral surfaces 10c of the group of battery cells C to each other, but are flat surfaces surrounding and being tangent to waved surfaces connecting the lateral surfaces 10c of the group of battery cells C to each other. Therefore, the long sides B1 and the short sides B2 along which the lateral surfaces S and the upper surface U (or the lower surface L) are in contact with each other are not waved sides connecting the lateral surfaces 10c of the group of battery cells C but are straight sides surrounding and being tangent to waved sides.

Referring back to FIG. 2, according to an embodiment, the battery pack may include a flexible wiring 40. As will be described in more detail below with reference to FIG. 4, the flexible wiring 40 may surround the cell block B in a direction parallel to the long sides B1 of the cell block B to detect state information from the battery cells C.

As illustrated in FIG. 2, the battery pack may include the holder 50 to structurally bind the battery cells C together. The holder 50 may include an array of cell accommodation portions 51 having a cylindrical shape and matching the lateral surfaces 10c of the battery cells C to surround the lateral surfaces 10c of the battery cells C, so the battery cells C may be surrounded by the cell accommodation portions 51 and assembled in place. The battery cells C may be placed, e.g., arranged, at staggered positions such that the battery cells C may be inserted between each other, e.g., the battery cells C may be arranged in a honeycomb pattern to have adjacent rows offset with respect to each other, thereby increasing the density of the battery cells C in the battery pack. According to the dense arrangement of the battery cells C, the cell accommodation portions 51 surrounding the battery cells C may also be arranged in the same dense pattern as the battery cells C.

The holder 50 may include terminal holes 50' to expose at least portions of the upper end portions 10a and the lower end portions 10b of the battery cells C, and allow electrical connection through the upper end portions 10a and the lower end portions 10b. For example, the terminal holes 50' may be through-holes penetrating the cell accommodation portions 51 of the holder 50. For example, the tab plates 80 may be arranged on, e.g., above, the holder 50 and may be electrically connected to the upper end portions 10a and the lower end portions 10b of the battery cells C that are exposed through the terminal holes 50' of the holder 50.

The holder 50 may include an upper holder 50a and a lower holder 50b that respectively surround the upper end portions 10a and the lower end portions 10b of the battery cells C, and the lateral surfaces 10c of the battery cells C may be exposed between the upper holder 50a and the lower holder 50b in the length direction of the battery cells C. As will be described in more detail below, temperature detection positions PT (refer to FIG. 4) of the flexible wiring 40 may be formed on exposed portions of the lateral surfaces 10c of the battery cells C.

The holder 50 may not be integrally formed with respect to the group of battery cells C electrically connected to each other, but may be divided into two parts in a direction Z1 parallel to the long sides B1 of the cell block B. For example, the lower holder 50b may include first and second holders 50b1 and 50b2 that are spaced apart from each other in the direction Z1 parallel to the long sides B1 of the cell block B. As described below, an end extension portion 40e (refer to FIG. 7) of the flexible wiring 40 may extend into the cell block B through a gap between the first and second holders 50b1 and 50b2 that are spaced apart from each other, and may form a temperature detection position PT inside the cell block B. In another embodiment, the lower holder 50b may be divided in the direction Z1 parallel to the long sides B1 of the cell block B according to the number of temperature detection positions PT required to be formed inside the cell block B. Furthermore, according to an embodiment, unlike the lower holder 50b, the upper holder 50a may be formed in one piece with respect to the group of battery cells C electrically connected to each other.

The group of battery cells C forming the cell block B may be electrically connected to each other through the tab plates 80. The tab plates 80 may electrically connect the battery cells C to each other by connecting the upper end portions 10a and the lower end portions 10b of the battery cells C. In this case, the tab plates 80 may electrically connect the battery cells C in parallel to each other by connecting identical polarities together and may electrically connect the battery cells C in series to each other by connecting opposite polarities together.

The battery cells C electrically connected to each other by the tab plates 80 may be arranged with the same vertical orientation in a parallel connection direction Z2 such that identical polarities may be connected to each other through the tab plates 80 for parallel connection, and may be arranged with vertically reversed orientations in a series connection direction Z1 such that opposite polarities may be connected together through the tab plates 80 for series connection. Here, the parallel connection direction Z2 and the series connection direction Z1 may respectively refer to a direction Z2 parallel to the short sides B2 of the cell block B and a direction Z1 parallel to the long sides B1 of the cell block B. In an embodiment, the arrangement of the battery cells C in the direction Z2 parallel to the short sides B2 of the cell block B may form parallel connection in which identical polarities are connected to each other through the tab plates 80, and the arrangement of the battery cells C in the direction Z1 parallel to the long sides B1 of the cell block B may form series connection in which different polarities are connected to each other through the tab plates 80. In this case, the arrangement of the battery cells C forming series connection is set to be longer than the arrangement of the battery cells C forming parallel connection such that the series connection direction Z1 may be parallel to the long sides B1 which are relatively long, and the parallel connection direction Z2 may be parallel to the short sides B2 which are relatively short.

In an embodiment, the parallel connection direction Z2 may be the length direction Z2 of the tab plates 80 in which each tab plate 80 extends, and the series connection direction Z1 may be an arrangement direction Z1 in which the tab plates 80 are arranged. The battery cells C may be connected in parallel to each other in the length direction Z2 of the tab plates 80 and may be connected in series to each other in the arrangement direction Z1 in which the tab plates 80 are arranged.

The tab plates 80 may include upper tab plates 80a connected to the upper end portions 10a of the battery cells C, and lower tab plates 80b connected to the lower end portions 10b of the battery cells C. The battery cells C arranged in the parallel connection direction Z2 parallel to the short sides B2 of the cell block B may be connected in parallel to each other through the upper tab plates 80a and the lower tab plates 80b, and the battery cells C arranged in the series connection direction Z1 parallel to the long sides B1 of the cell block B may be connected in series to each other through the upper tab plates 80a and the lower tab plates 80b. In this case, the upper tab plates 80a and the lower tab plates 80b may be staggered in an alternating pattern in the series connection direction Z1 such that the battery cells C arranged in the series connection direction Z1 may be connected in series to each other through the upper tab plates 80a and the lower tab plates 80b. As described later, according to an embodiment, the flexible wiring 40 may extend to surround the cell block B in the series connection direction Z1 parallel to the long sides B1 and may form, e.g., include, voltage detection positions PV (refer to FIG. 4) while extending across the tab plates 80 arranged in the series connection direction Z1.

The circuit board 100 may be placed on the tab plates 80. The circuit board 100 may collect state information from the battery cells C and control charge and discharge operations of the battery cells C based on the collected state information. For example, the circuit board 100 may detect malfunctions of the battery cells C, e.g., overheating, overcharging, or overdischarging, and may take protective measures to prevent accidents, e.g., explosions or fires, and may stop charge and discharge operations of the battery cells C by using a switch device 90 provided on a charge-discharge path.

The flexible wiring 40 may be connected to the circuit board 100. An end portion of the flexible wiring 40 may be connected to the circuit board 100 to form a connection position PB, and voltage and temperature information collected through the flexible wiring 40 may be transmitted to the circuit board 100 via the connection position PB.

The cooling plate 110 may be arranged between the circuit board 100 and the tab plates 80. In an embodiment, the cooling plate 110 is arranged between the circuit board 100 and the tab plates 80, and thus, state information regarding the battery cells C may not be transmitted directly from the tab plates 80 to the circuit board 100. Thus, in an embodiment, state information regarding the battery cells C may be transmitted to the circuit board 100 through the flexible wiring 40, which extends around the cell block B in opposite directions to surround the cell block B.

The cooling plate 110 may be arranged between the tab plates 80 and the circuit board 100 to cool the circuit board 100 together with the battery cells C connected to the tab plates 80. For example, the cooling plate 110 may cool circuit elements arranged on the circuit board 100 and the switch device 90 connected to the circuit board 100, and may cool the battery cells C through the tab plates 80. For example, the cooling plate 110 may cool the switch device 90, which is connected to the circuit board 100 and placed on the charge-discharge path to connect and disconnect the charge and discharge path. In addition, the switch device 90 may be provided between the circuit board 100 and an external terminal E2. A pair of external terminals E1 and E2 may be formed and may be respectively connected to the circuit board 100 and the switch device 90. In addition, reference numeral 130 in FIG. 2 denotes an insulating frame for insulating the tab plates 80 (the lower tab plates 80b).

Figure 4:
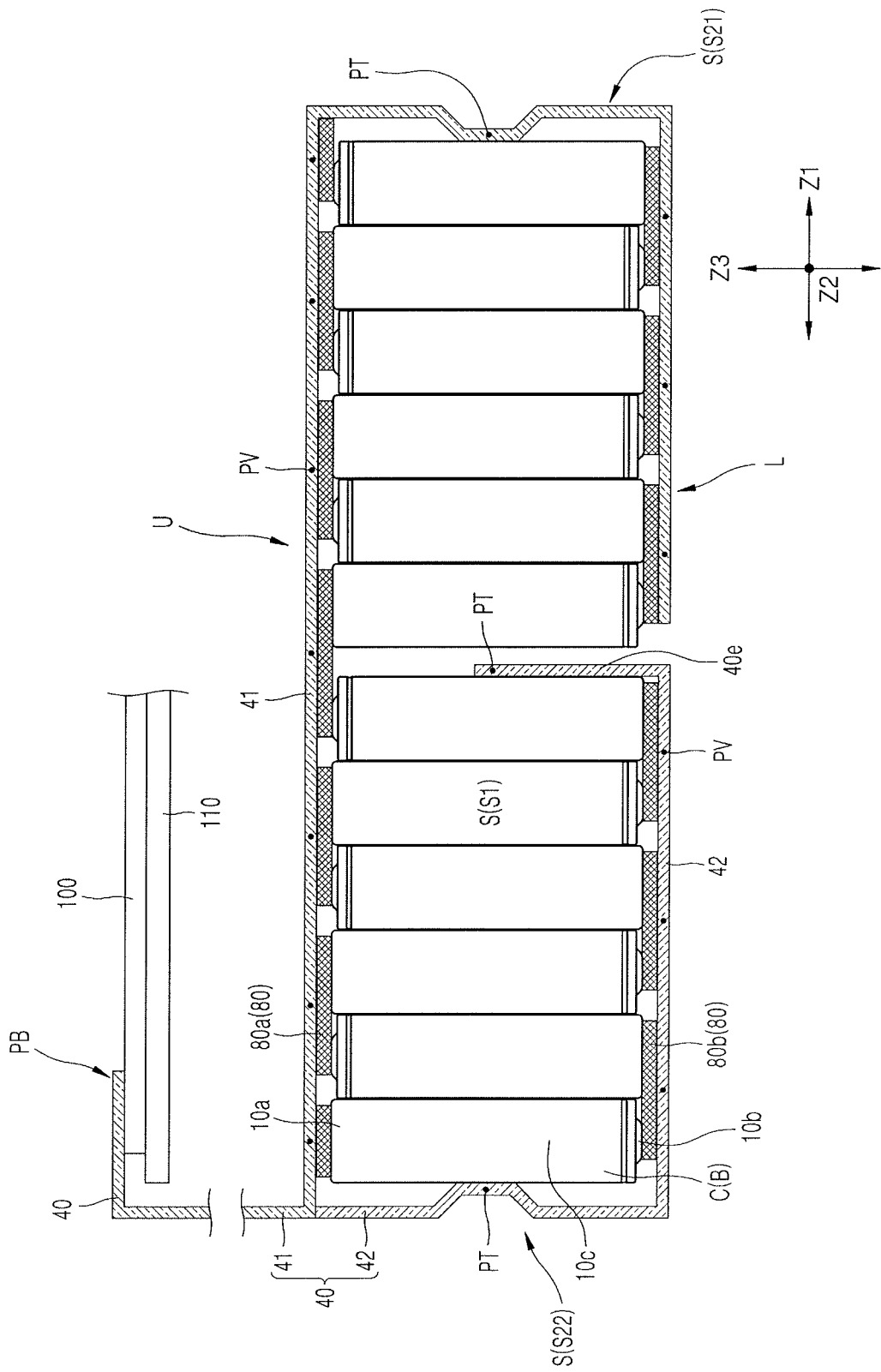
FIG. 4 is a view schematically illustrating an arrangement of flexible wiring.
Figure 5:
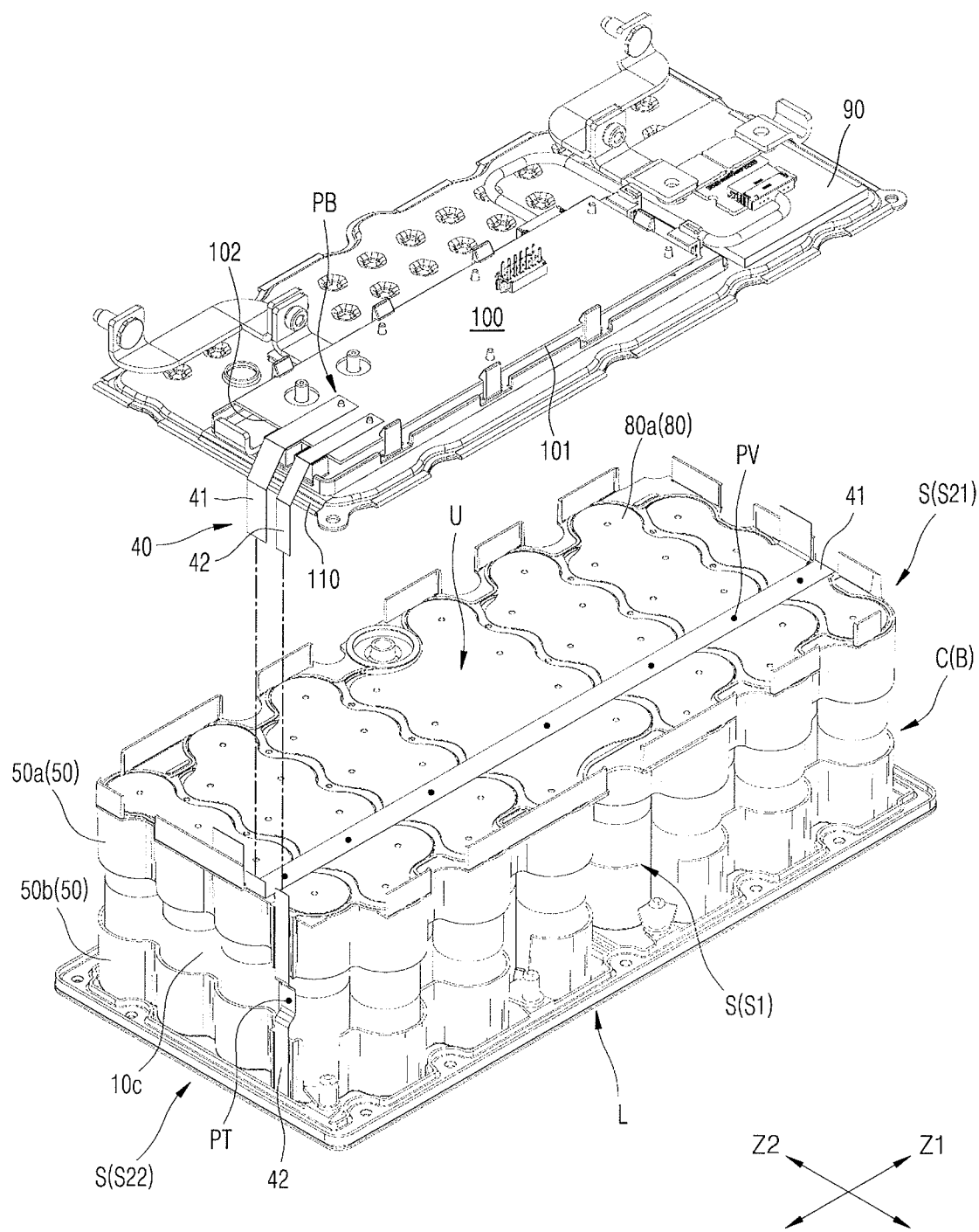
FIGS. 5 to 7 are perspective views illustrating the battery pack in different directions according to embodiments.
Figure 6:
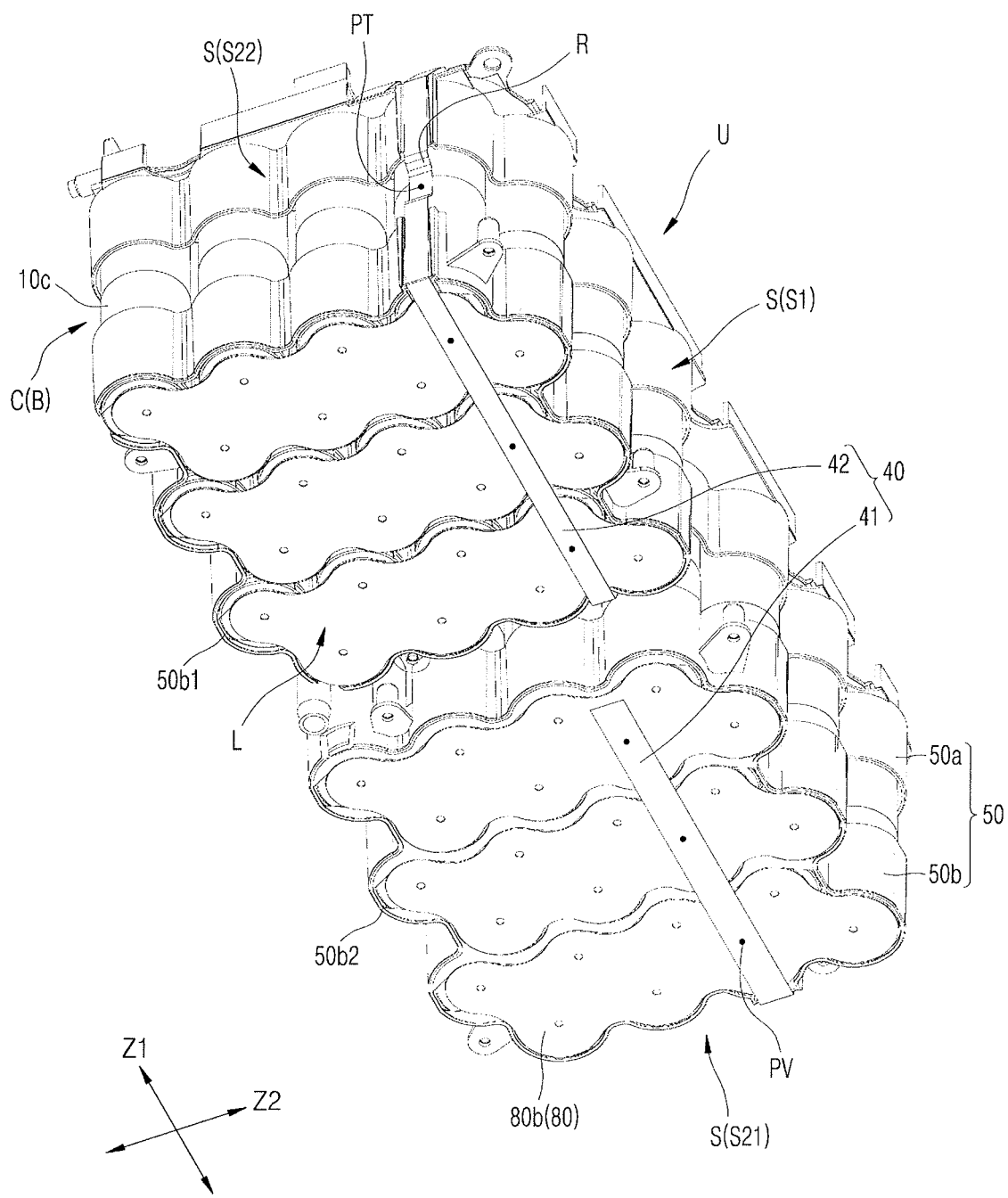
Figure 7:
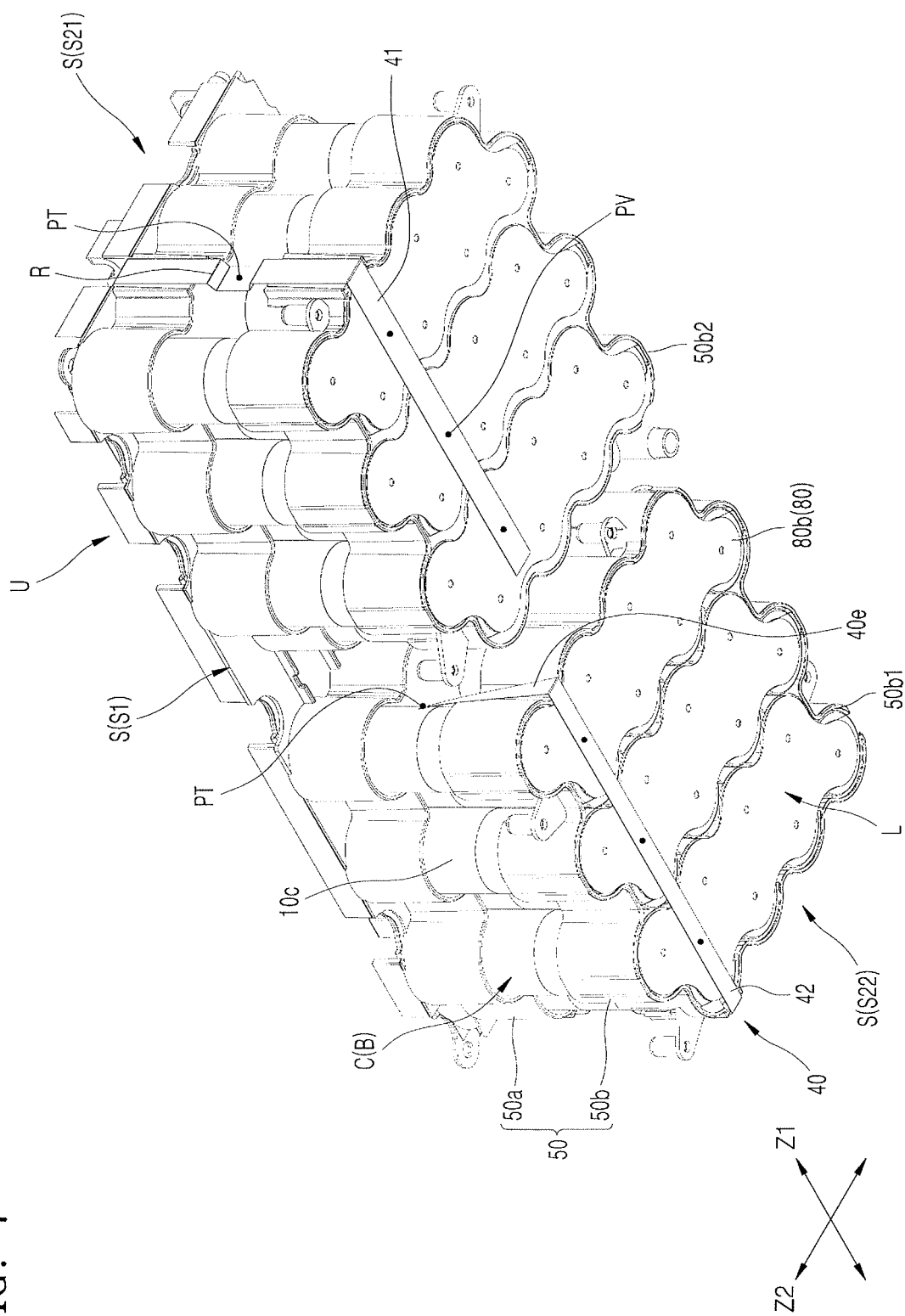

FIG. 4 is a view schematically illustrating an arrangement of the flexible wiring 40. FIGS. 5 to 7 are perspective views illustrating the battery pack in different directions according to embodiments. FIG. 8 illustrates a structure of the flexible wiring 40.

Referring to FIGS. 4 to 7, according to embodiments, the battery pack may include the flexible wiring 40 that surrounds the cell block B in the direction Z1 parallel to the long sides B1 of the cell block B for detecting state information about the battery cells C, e.g., the flexible wiring 40 may extend along surfaces U and L along the direction Z1 to surround the cell block B. The flexible wiring 40 may extend to surround the cell block B in the direction Z1 parallel to the long sides B1 of the cell block B to efficiently collect state information about the group of battery cells C forming the cell block B. The flexible wiring 40 extends to surround the cell block B in the direction Z1 parallel to the long sides B1 of the cell block B such that the flexible wiring 40 may extend across a relatively large number of battery cells C and the number of battery cells C, which are monitorable using the flexible wiring 40 wound once around the cell block B, may be increased. For example, if the flexible wiring 40 were to extend around the cell block B in the direction Z2 parallel to the short sides B2 of the cell block B (rather than the direction Z1), the flexible wiring 40 would extend across a relatively small number of battery cells C, thereby limiting the number of monitorable battery cells C via a single flexible wiring 40 and requiring additional flexible wiring 40 to collect state information from a same number of battery cells C.

In an embodiment, the flexible wiring 40 may include a first flexible wire 41 surrounding the cell block B in a forward direction parallel to the long sides B1 of the cell block B, and a second flexible wire 42 surrounding the cell block B in a reverse direction parallel to the long sides B1 of the cell block B. Here, the forward direction and the reverse direction may respectively refer to clockwise and counterclockwise directions which are parallel to the long sides B1 of the cell block B. For example, the first and second flexible wires 41 and 42 may extend in the direction Z1 parallel to the long sides B1 of the cell block B, such that when viewed toward lateral surface S1 of the cell block B (into the page of FIGS. 3 and 4), the first and second flexible wires 41 and 42 surround the cell block B respectively in the clockwise and counterclockwise directions.

For example, the first flexible wire 41 may surround the cell block B in the forward direction (e.g., extend right in FIG. 4) parallel to the long sides B1 of the cell block B, while extending across the upper surface U and a first lateral surface S21 of the cell block B, and extending to a side of the lower surface L of the cell block B. The second flexible wire 42 may surround the cell block B in the reverse direction parallel to the long sides B1 of the cell block B, while extending across a second lateral surface S22 of the cell block B to the other side of the lower surface L of the cell block B. Here, the first and second lateral surfaces S21 and S22 of the cell block B, across which the first and second flexible wires 41 and 42 extend, may be lateral surfaces S which face each other in the direction Z1 parallel to the long sides B1.

The first and second flexible wires 41 and 42 may extend across the upper and lower surfaces U and L of the cell block B, which are opposite each other, and across the first and second lateral surfaces S21 and S22 of the cell block B, which are opposite each other, such that state information may be detected through the first and second flexible wires 41 and 42. For example, the first and second flexible wires 41 and 42 may form a plurality of voltage detection positions PV along extension paths thereof. For example, the first and second flexible wires 41 and 42 may form, e.g., define, voltage detection positions PV while making conductive contact with the tab plates 80 that electrically connect the battery cells C to each other. The tab plates 80 electrically connected to the upper end portions 10a and the lower end portions 10b of the battery cells C may have substantially the same potentials as the electrodes of the battery cells C, and thus, voltage information about the battery cells C may be detected through the flexible wiring 40, which are in conductive contact with the tab plates 80. For example, referring to FIGS. 2 and 4, when the battery pack is assembled, a portion of the first flexible wire 41 (on the upper surface U) may extend between the cooling plate 110 and the upper tab plate 80a, and a portion of the second flexible wire 42 (on the lower surface L) may extend between the insulating plate 130 and the lower tab plate 80b.

For example, while extending across the upper surface U of the cell block B, the first flexible wire 41 may make conductive contact with the upper tab plates 80a connected to the upper end portions 10a of the battery cells C to form voltage detection positions PV, and while extending across one side of the lower surface L of the cell block B, the first flexible wire 41 may make conductive contact with the lower tab plates 80b connected to the lower end portions 10b of the battery cells C to form voltage detection positions PV. Similarly, while extending across the other side of the lower surface L of the cell block B, the second flexible wire 42 may make conductive contact with the lower tab plates 80b connected to the lower end portions 10b of the battery cells C to form voltage detection positions PV.

The first flexible wire 41 may be arranged on one side of the lower surface L of the cell block B (e.g., right side of FIG. 4), and the second flexible wire 42 may be arranged on the other side of the lower surface L of the cell block B (e.g., left side of FIG. 4), such that the lower surface L of the cell block B may be divided into two sides that do not overlap each other, and voltage information may be collected from the two sides respectively through the first and second flexible wires 41 and 42. The first and second flexible wires 41 and 42 are for detecting state information from the battery cells C while extending across the cell block B, and since the combination of the first and second flexible wires 41 and 42 extends around the cell block B, state information may be detected from the group of battery cells C electrically connected to each other. For effective detection of state information from the battery cells C, the first and second flexible wires 41 and 42 may not be arranged in an overlapping manner. For example, the first and second flexible wires 41 and 42 may have a non-overlapping relationship on the lower surface L in a plan view, e.g., the first and second flexible wires 41 and 42 may define a single loop surrounding the cell block B without overlapping portions. As shown in FIG. 6, the sides of the lower surface L of the cell block B on which the first and second flexible wires 41 and 42 are respectively arranged may correspond to the bottom surfaces of the first and second holders 50b1 and 50b2, which are separated from each other.

Referring to FIGS. 5 and 6, in an embodiment, the flexible wiring 40 may extend to surround the cell block B in the series connection direction Z1 parallel to the long sides B1 and may form the voltage detection positions PV together with the tab plates 80 while extending across the tab plates 80 arranged in the series connection direction Z1. As described above, the series connection direction Z1 may refer to the direction Z1 in which the tab plates 80 are arranged, and the flexible wiring 40 may extend across the tab plates 80 arranged in the series connection direction Z1 to collect voltage information via the tab plates 80.

Referring to FIG. 4, the flexible wiring 40 may be used to detect temperature information together with voltage information. The flexible wiring 40 may form voltage detection positions PV for detecting voltage information about the battery cells C while making conductive contact with the tab plates 80 arranged on the upper surface U and the lower surface L of the cell block B, and may form temperature detection positions PT for detecting temperature information about the battery cells C while extending across the lateral surfaces S of the cell block B and making thermal contact with the lateral surfaces 10c of the battery cells C.

The first and second flexible wires 41 and 42 may surround the cell block B in the forward and reverse directions parallel to the long sides B1 of the cell block B while extending across the first and second lateral surfaces S21 and S22 of the cell block B that are opposite each other in the direction Z1 parallel to the long sides B1, and may form temperature detection positions PT on the lateral surfaces 10c of the battery cells C to detect temperature information. As shown in FIG. 6, at the temperature detection positions PT, the lateral surfaces 10c of the battery cells C may be exposed between the upper holder 50a and the lower holder 50b that surround the battery cells C. That is, the temperature detection positions PT of the flexible wiring 40 may be formed, e.g., directly, on the exposed lateral surfaces 10c of the battery cells C.

The flexible wiring 40 may form the temperature detection positions PT on the lateral surfaces 10c of the battery cells C, and bent portions R may be formed in front of and behind each of the temperature detection positions PT in the length direction of the flexible wiring 40. The bent portions R of the flexible wiring 40 may be structures protruding toward the lateral surfaces 10c of the battery cells C and making tight contact with the lateral surfaces 10c of the battery cells C to form the temperature detection positions PT, and may be structures for effectively bringing the flexible wiring 40 (for example, refer to thermistors 40b shown in FIG. 8) into, e.g., direct, contact with the lateral surfaces 10c of the battery cells C. For example, as illustrated in FIG. 6, each bent portion R of the flexible wiring 40 may extend between respective upper and lower holders 50a and 50b, e.g., in an approximate U-shape, on an exposed portion of the battery cell C between the upper holder 50a and the lower holder 50b to define the temperature detection positions PT, e.g., each bent portion R may protrude from a linear portion of the flexible wiring 40 on the holder 50 toward an exposed portion of the battery cell C between the upper holder 50a and the lower holder 50b.

Referring to FIG. 4, the first and second flexible wires 41 and 42 may form temperature detection positions PT on the first and second lateral surfaces S21 and S22 of the cell block B, and heat may be relatively easily dissipated from the first and second lateral surfaces S21 and S22 of the cell block B because the first and second lateral surfaces S21 and S22 of the cell block B are exposed to the outside. In an embodiment, a temperature detection position PT may be formed on an inner portion of the cell block B from which heat is relatively poorly dissipated because the inner portion is not exposed to the outside. For example, the second flexible wire 42 may extend on the lower surface L across the second lateral surface S22 of the cell block B while extending along the cell block B in the reverse direction parallel to the long sides B1, and an end extension portion 40e of the second flexible wire 42 may enter the inside of the cell block B, e.g., may extend between two adjacent interior battery cells C of the cell block B to include a temperature detection position PT on the lateral surface 10c of an internal battery cell C.

For example, referring to FIG. 7, the end extension portion 40e of the second flexible wire 42 may enter the inside of the cell block B through the gap which is formed in the lower surface L of the cell block B between the first and second holders 50b1 and 50b2, and may form a temperature detection position PT on the lateral surface 10c of an internal battery cell C. As described above, according to an embodiment, temperature detection positions PT are formed on the first and second lateral surfaces S21 and S22 of the cell block B, which are outer lateral surfaces S of the cell block B, and on an inner portion of the cell block B from which heat is relatively poorly dissipated, such that overheating of the cell block B may be detected without failure to take measures against overheating.

Referring to FIG. 8, the flexible wiring 40 may have, e.g., exhibit, flexibility to surround the cell block B in the forward and reverse directions parallel to the long sides B1 of the cell block B. The flexible wiring 40 may include sensing structures at the voltage detection positions PV and the temperature detection positions PT of the battery cells C, and voltage detection lines and temperature detection lines connected to the voltage detection positions PV and the temperature detection positions PT. For example, the flexible wiring 40 may be a flexible circuit board but is not limited thereto.

For example, the flexible wiring 40 may form voltage detection positions PV and temperature detection positions PT at different locations in the length direction Z1 of the flexible wiring 40. In other words, while surrounding the cell block B, the flexible wiring 40 may form voltage detection positions PV on the upper surface U and the lower surface L of the cell block B, and temperature detection positions PT on the first and second lateral surfaces S21 and S22 of the cell block B, i.e., the voltage detection positions PV and temperature detection positions PT at different locations in the length direction Z1 of the flexible wiring 40. For example, the flexible wiring 40 may form a plurality of voltage detection positions PV at different locations in the length direction Z1 of the flexible wiring 40, and similarly, the flexible wiring 40 may form a plurality of temperature detection positions PT at different positions in the length direction of the flexible wiring 40.

The flexible wiring 40 may include conductive pads 40a which are exposed through an insulating film 40c of the flexible wiring 40 at the voltage detection positions PV. The conductive pads 40a may be connected to the voltage detection lines covered with the insulating film 40c of the flexible wiring 40, and the voltage detection lines may be connected to the circuit board 100 through a connector CN formed at an end portion of the flexible wiring 40.

The flexible wiring 40 may include thermistors 40b exposed through the insulating film 40c of the flexible wiring 40 at the temperature detection positions PT. In an embodiment, the thermistors 40b may be chip-type thermistors, which are directly mounted on the flexible wiring 40 by a solder mounting method in which terminals of the thermistors 40b are fitted to the flexible wiring 40 and solder is applied thereto. In this case, since the thermistors 40b provided as chip-type thermistors are directly mounted on the flexible wiring 40, additional leads for connecting the thermistors 40b to the flexible wiring 40 are not required. The thermistors 40b may be connected to the temperature detection lines covered with the insulating film 40c of the flexible wiring 40, and the temperature detection lines may be connected to the circuit board 100 through the connector CN formed on the end portion of the flexible wiring 40.

Referring to FIG. 5, the flexible wiring 40 may be connected to the circuit board 100. For example, the flexible wiring 40 may include the first and second flexible wires 41 and 42, and connection positions PB of the first and second flexible wires 41 and 42 may be formed on the same side of the circuit board 100. For example, the circuit board 100 may include a relatively long side 101 and a relatively short side 102, and the connection positions PB of the first and second flexible wires 41 and 42 may be formed on the same short side 102. In an embodiment, the first and second flexible wires 41 and 42 may extend to surround the cell block B in the direction Z1 parallel to the long sides B1 of the cell block B, and to this end, the first and second flexible wires 41 and 42 may surround the cell block B from a short side B2 of the cell block B. In this case, the connection positions PB may be formed on the short side 102 of the circuit board 100, which is parallel to the short sides B2 of the cell block B. The first and second flexible wires 41 and 42 may extend in the direction Z1 parallel to the long sides B1 of the cell block B from the connection positions PB with the circuit board 100. In another embodiment, the connection positions PB of the first and second flexible wires 41 and 42 may be respectively formed on opposite short sides 102 of the circuit board 100.

Although the connection positions PB of the first and second flexible wires 41 and 42 are formed on the same side of the circuit board 100, the connection positions PB of the first and second flexible wires 41 and 42 may not be the same position or may not overlap each other. For example, the connection positions PB of the first and second flexible wires 41 and 42 may be offset along the short side 102 of the circuit board 100. Therefore, electrical and physical interference between the first and second flexible wires 41 and 42 may be prevented.

In an embodiment, the first and second flexible wires 41 and 42 may not surround the cell block B in such a manner that the first and second flexible wires 41 and 42 extend in the forward and reverse directions, which are parallel to the long sides B1 of the cell block B, immediately from the connection positions PB of the circuit board 100. For example, in an embodiment, the first and second flexible wires 41 and 42 may extend in the same direction from the connection positions PB of the circuit board 100 toward an edge of the cooling plate 110, and then the first and second flexible wires 41 and 42 may extend from the edge of the cooling plate 110 in the forward and reverse directions to surround the cell block B. For example, the first flexible wire 41 may extend in parallel with the second flexible wire 42 from the connection positions PB of the circuit board 100, then along the cooling plate 110 to bypass the cooling plate 110, and then between the cooling plate 110 and the cell block B to form the voltage detection positions PV on the upper surface U of the cell block B.

In embodiments, the expression "the first and second flexible wires 41 and 42 surround the cell block B in the forward and reverse directions which are parallel to the long sides B1" is for describing the directions in which the first and second flexible wires 41 and 42 surround the cell block B, but is not for describing the direction in which the first and second flexible wires 41 and 42 extend in parallel to each other from the connection positions PB of the circuit board 100 before the first and second flexible wires 41 and 42 surround the cell block B or is not for describing the direction in which the first flexible wire 41 surrounds the cooling plate 110. For example, the first and second flexible wires 41 and 42 may extend in the same direction from the connection positions PB of the circuit board 100. However, the direction is not a direction in which the first and second flexible wires 41 and 42 surround the cell block B, and the directions in which the first and second flexible wires 41 and 42 surround the cell block B are the forward and reverse directions, which are opposite each other.

By way of summation and review, one or more embodiments include a battery pack having an improved structure for collecting state information from a plurality of battery cells. That is, as described above, according to the one or more of the above embodiments, state information may be collected from the battery cells C through the flexible wiring 40 surrounding the cell block B in the forward and reverse directions to detect temperature information about the battery cells C and also voltage information about the battery cells C.

Further, according to the one or more of the above embodiments, cooling efficiency may be improved due to the cooling plate 110 provided between the cell block B and the circuit board 100. In addition, state information about the battery cells C may be easily collected through the flexible wiring 40 which connects the cell block B to the circuit board 100 while bypassing the cooling plate 110.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A battery pack, comprising:
a cell block including battery cells electrically connected to each other, the cell block having a pair of long sides and a pair of short sides which surround lateral surfaces of the battery cells and are tangent to the lateral surfaces of the battery cells; and
a flexible wiring surrounding the cell block in a direction parallel to the pair of long sides of the cell block, at least a portion of the flexible wiring extending continuously along at least three different surfaces of the cell block, and the flexible wiring including sensors to detect state information from the battery cells,
wherein upper end portions of the battery cells face a circuit board, an upper surface of the cell block being defined by the upper end portions of the battery cells, and a lower surface of the cell block being opposite the upper surface of the cell block, and
wherein the flexible wiring continuously surrounds the upper and lower surfaces of the cell block, and continuously surrounds opposite first and second lateral surfaces between the upper and lower surfaces of the cell block, the flexible wiring to collect state information from the battery cells.

2. The battery pack as claimed in claim 1, wherein the flexible wiring surrounds the opposite upper and lower surfaces and the opposite first and second lateral surfaces of the cell block in opposite directions parallel to the pair of long sides of the cell block.

3. The battery pack as claimed in claim 1, wherein the flexible wiring includes:
voltage detection positions on the upper and lower surfaces of the cell block; and
temperature detection positions on the first and second lateral surfaces of the cell block.

4. The battery pack as claimed in claim 1, wherein the flexible wiring includes an end extension portion extending along the lower surface of the cell block and into the cell block, the end extension portion being directly on a surface of one of the battery cells and including a temperature detection position inside the cell block.

5. The battery pack as claimed in claim 4, further comprising a holder to hold the battery cells, the holder including a first holder and a second holder separate from each other in a direction parallel to the pair of long sides of the cell block, and the end extension portion extending into the cell block through a gap between the first and second holders.

6. The battery pack as claimed in claim 1, further comprising a tab plate electrically connecting the battery cells to each other, the flexible wiring conductively contacting the tab plate at voltage detection positions, and thermally contacting lateral surfaces of the battery cells at temperature detection positions.

7. The battery pack as claimed in claim 1, further comprising a plurality of tab plates electrically connecting the battery cells to each other, the plurality of tab plates extending in parallel to the pair of long sides of the cell block,
wherein the flexible wiring extends across the plurality of tab plates and defines voltage detection positions at conductive contact points with the plurality of tab plates.

8. The battery pack as claimed in claim 1, wherein:
the flexible wiring extends continuously along an entire height of each of the pair of short sides of the cell block, and
the flexible wiring includes bent portions at temperature detection positions along the pair of short sides of the cell block, each of the bent portions protruding from the flexible wiring toward a corresponding battery cell of the battery cells to contact a surface of the corresponding battery cell.

9. The battery pack as claimed in claim 1, further comprising:
the circuit board connected to the flexible wiring; and
a cooling plate between the circuit board and the cell block,
wherein the flexible wiring extends from a connection position with the circuit board while surrounding the cooling plate to bypass the cooling plate, and extends between the cooling plate and the cell block to define voltage detection positions.

10. The battery pack as claimed in claim 1, wherein the flexible wiring includes:
a first flexible wire extending from a first side above the cell block and continuously surrounding the cell block in a forward direction parallel to the pair of long sides of the cell block; and
a second flexible wire extending from the first side above the cell block and continuously surrounding the cell block in a reverse direction relative to the first flexible wire and parallel to the pair of long sides of the cell block.

11. The battery pack as claimed in claim 10, wherein:
the first and second flexible wires extend from the first side of a circuit board above the cell block, the first and second flexible wires being adjacent to each other on the first side of the circuit board,
the first flexible wire surrounds continuously portions of at least three different surfaces of the cell block in a clockwise direction parallel to the pair of long sides of the cell block, and
the second flexible wire surrounds continuously portions of at least two different surfaces of the cell block in a counterclockwise direction parallel to the pair of long sides of the cell block, the first and second flexible wires surrounding different portions of surfaces of the cell block.

12. The battery pack as claimed in claim 10, wherein:
   the first flexible wire extends continuously along the upper surface and the first lateral surface of the cell block to extend to a first side of the lower surface of the cell block, and
   the second flexible wire extends continuously along the second lateral surface of the cell block to extend to a second side of the lower surface of the cell block, the first and second sides of the lower surface being opposite to each other.

13. The battery pack as claimed in claim 12, further comprising a cooling plate on the cell block, the first flexible wire extending between the cooling plate and the upper surface of the cell block.

14. The battery pack as claimed in claim 12, further comprising a holder into which the battery cells are inserted, the holder including a first holder and a second holder which are separate from each other in a direction parallel to the pair of long sides of the cell block, and first and second sides of the lower surface of the cell block respectively correspond to lower surfaces of the second and first holders.

15. The battery pack as claimed in claim 12, wherein the second flexible wire extends along the second side of the lower surface of the cell block into the cell block, a portion of the second flexible wire extending into the cell block being parallel to the second lateral surface and directly contacting a surface of one of the battery cells.

16. The battery pack as claimed in claim 1, wherein the flexible wiring includes voltage detection positions together with a plurality of tab plates arranged in a length direction of the flexible wiring.

17. The battery pack as claimed in claim 1, wherein the flexible wiring includes voltage detection positions and temperature detection positions that are spaced apart from each other in a length direction of the flexible wiring.

18. The battery pack as claimed in claim 1, wherein the flexible wiring includes thermistors on the flexible wiring at temperature detection positions.

* * * * *